United States Patent
Parks et al.

(10) Patent No.: US 11,608,079 B2
(45) Date of Patent: Mar. 21, 2023

(54) SYSTEM AND METHOD TO ADJUST OVERTAKE TRIGGER TO PREVENT BOXED-IN DRIVING SITUATIONS

(71) Applicant: GM GLOBAL TECHNOLOGY OPERATIONS LLC, Detroit, MI (US)

(72) Inventors: Jeffrey S. Parks, Ann Arbor, MI (US); Namal P. Kumara, Ypsilanti, MI (US); Paul A. Adam, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 421 days.

(21) Appl. No.: 16/896,552

(22) Filed: Jun. 9, 2020

(65) Prior Publication Data

US 2021/0380131 A1    Dec. 9, 2021

(51) Int. Cl.
| | |
|---|---|
| *B60W 60/00* | (2020.01) |
| *B60W 30/18* | (2012.01) |
| *G06K 9/00* | (2022.01) |
| *G06V 20/56* | (2022.01) |

(52) U.S. Cl.
CPC ............. *B60W 60/0011* (2020.02); *B60W 30/18163* (2013.01); *B60W 60/00274* (2020.02); *G06V 20/588* (2022.01); *B60W 2554/4045* (2020.02); *B60W 2554/4049* (2020.02)

(58) Field of Classification Search
CPC ........... B60W 30/16; B60W 30/18163; B60W 50/14; B60W 60/001; B60W 60/0011; B60W 60/00274; B60W 2050/0075; B60W 2520/10; B60W 2555/60; G06V 20/58; G06V 20/588; G08G 1/0133; G08G 1/0145; G08G 1/09626; G08G 1/163; G08G 1/167
See application file for complete search history.

(56) References Cited

U.S. PATENT DOCUMENTS

| | | | |
|---|---|---|---|
| 2015/0194055 A1* | 7/2015 | Maass | B60W 30/18163 340/905 |
| 2016/0063858 A1* | 3/2016 | Schmüdderich | B60W 40/04 701/117 |
| 2017/0242435 A1* | 8/2017 | Nilsson | G05D 1/0214 |
| 2019/0276020 A1* | 9/2019 | Kanoh | B60W 30/182 |
| 2022/0144273 A1* | 5/2022 | Yamaguchi | B60W 30/18159 |

* cited by examiner

*Primary Examiner* — Peter D Nolan
*Assistant Examiner* — Ce Li Li
(74) *Attorney, Agent, or Firm* — Lorenz & Kopf LLP

(57) ABSTRACT

One general aspect includes a system to prevent a boxed-in driving situation, the system including: a memory configured to include one or more executable instructions and a processor configured to execute the executable instructions, where the executable instructions enable the processor to detect a preventable box-in driving situation; and, based on the detection of the preventable box-in driving situation, adjust a location of a trigger threshold along a vehicle path.

14 Claims, 6 Drawing Sheets

… (1)

SYSTEM AND METHOD TO ADJUST OVERTAKE TRIGGER TO PREVENT BOXED-IN DRIVING SITUATIONS

INTRODUCTION

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS) provide features such as, for example, cruise control, adaptive cruise control, hands-free driving assistance, and parking assistance. In particular, the hands-free driving assistance feature and other similar enhanced cruise control features generally use sensors to detect lane markers and other roadway indicators to generate a motion path for a host vehicle to follow to remain on the roadway. These hands-free driving assistance features can also incorporate lane change on demand functionality that allows the host vehicle to determine when a closest in-path vehicle (CIPV) is moving slower than it is currently traveling and then merge into a parallel lane along the roadway for the purposes of passing the CIPV. As such, the host vehicle will scan for an acceptable opening in the target lane, while also taking time to let other cars know that a lane change is imminent (e.g., via turn signals on one of the vehicle's taillights). If the host vehicle determines that the target lane is open, the host vehicle will merge into that lane. However, when the host vehicle finds itself boxed in by the CIPV and other vehicles traveling along the target lane, long delays can occur before the boxed-in situation dissipates and the host vehicle can finally merge into the target lane. This situation is particularly noticeable when the host vehicle has a torque limited powertrain system. It is therefore desirable to provide a system and method that can dynamically adjust the trigger thresholds for its automated lane change feature in order to carry out the feature and cause the host vehicle to merge in a proactive manner and thus prevent the host vehicle from being boxed in by traffic. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to prevent a boxed-in driving situation, the system including: a memory configured to include one or more executable instructions and a processor configured to execute the executable instructions, where the executable instructions enable the processor to detect a preventable box-in driving situation; and, based on the detection of the preventable box-in driving situation, adjust a location of a trigger threshold along a vehicle path. Other embodiments of this aspect include corresponding computer systems, apparatus, and computer programs recorded on one or more computer storage devices, each configured to perform the actions of the methods.

Implementations may include one or more of the following features. The system where the executable instructions further enable the processor to, when a host vehicle reaches the adjusted location of the trigger threshold, command an automated overtake action. The system where the automated overtake action causes the host vehicle to move autonomously from a first lane along the vehicle path to a target lane along the vehicle path. The system where the preventable box-in driving situation includes a target vehicle in a target lane along the vehicle path, where the target vehicle prevents a host vehicle from moving safely from a first lane along the vehicle path to the target lane. The system where the preventable box-in driving situation includes a plurality of target vehicles in a target lane, where a host vehicle is approaching a location relative to a rear end of a closest target vehicle of the plurality of target vehicles; where adjustment of the location of the trigger threshold along the vehicle path is defined as—calculate a distance between the rear end of the closest target vehicle of the plurality of target vehicles and a front end of the host vehicle as a relevant distance; calculate a driver-selected speed; calculate a CIPV speed; determine an adjusted trigger threshold value based on the relevant distance, driver-selected speed, and CIPV speed; and, based on the adjusted trigger threshold value, adjust the location of the trigger threshold along the vehicle path. The system where the location of the trigger threshold is based on headway time. The system where the preventable box-in driving situation is detected via one or more sensors installed on a host vehicle. Implementations of the described techniques may include hardware, a method or process, or computer software on a computer-accessible medium.

One general aspect includes a method to prevent a boxed-in driving situation, the method including: detecting, via a processor, a preventable box-in driving situation; and, based on the detection of the preventable box-in driving situation, via the processor, adjusting a location of a trigger threshold along a vehicle path. Other embodiments of this aspect include corresponding computer systems, apparatus, and computer programs recorded on one or more computer storage devices, each configured to perform the actions of the methods.

Implementations may include one or more of the following features. The method further including, when a host vehicle reaches the adjusted location of the trigger threshold, via the processor, commanding an automated overtake action. The method where the automated overtake action causes the host vehicle to move autonomously from a first lane along the vehicle path to a target lane along the vehicle path. The method where the preventable box-in driving situation includes a target vehicle in a target lane along the vehicle path, where the target vehicle prevents a host vehicle from moving safely from a first lane along the vehicle path to the target lane. The method where the preventable box-in driving situation includes a plurality of target vehicles in a target lane, where a host vehicle is approaching a location relative to a rear end of a closest target vehicle of the plurality of target vehicles; where adjusting the location of the trigger threshold along the vehicle path is defined as calculating a distance between the rear end of the closest target vehicle of the plurality of target vehicles and a front end of the host vehicle as a relevant distance; calculating a driver-selected speed; calculating a CIPV speed; determining an adjusted trigger threshold value based on the relevant distance, driver-selected speed, and CIPV speed; and, based on the adjusted trigger threshold value, adjusting the location of the trigger threshold along the vehicle path. The method where the location of the trigger threshold is based on headway time. The method where the preventable box-in driving situation is detected via one or more sensors installed on a host vehicle. Implementations of the described techniques may include hardware, a method or process, or computer software on a computer-accessible medium.

One general aspect includes a system to prevent a boxed-in driving situation, the system including a memory configured to include one or more executable instructions and a processor configured to execute the executable instructions, where the executable instructions enable the processor to detect that a host vehicle is located within a zone of opportunity; detect a preventable box-in driving situation; and, based on the detection of the preventable box-in driving situation, adjust a location of a trigger threshold along a vehicle path. Other embodiments of this aspect include corresponding computer systems, apparatus, and computer programs recorded on one or more computer storage devices, each configured to perform the actions of the methods.

Implementations may include one or more of the following features. The system where the executable instructions further enable the processor to, when a host vehicle reaches the adjusted location of the trigger threshold, command an automated overtake action. The system where the automated overtake action causes the host vehicle to move autonomously from a first lane along the vehicle path to a target lane along the vehicle path. The system where the preventable box-in driving situation includes a target vehicles in a target lane, where the target vehicle is approaching a location relative to a rear end of the host vehicle, and where the target vehicle is outside of the zone of opportunity; where adjustment of the trigger threshold is defined as: calculate a distance between the rear end of a closest in-path vehicle (CIPV) and a front end of the host vehicle as a relevant distance; calculate a driver-selected speed; calculate a closest in-path vehicle (CIPV) speed; determine an adjusted trigger threshold value based on the relevant distance, driver-selected speed, and CIPV speed; and based on the adjusted trigger threshold value, adjust the location of the trigger threshold along the vehicle path. The system where the location of the trigger threshold is based on headway time. The system where the preventable box-in driving situation is detected via one or more sensors installed on a host vehicle. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
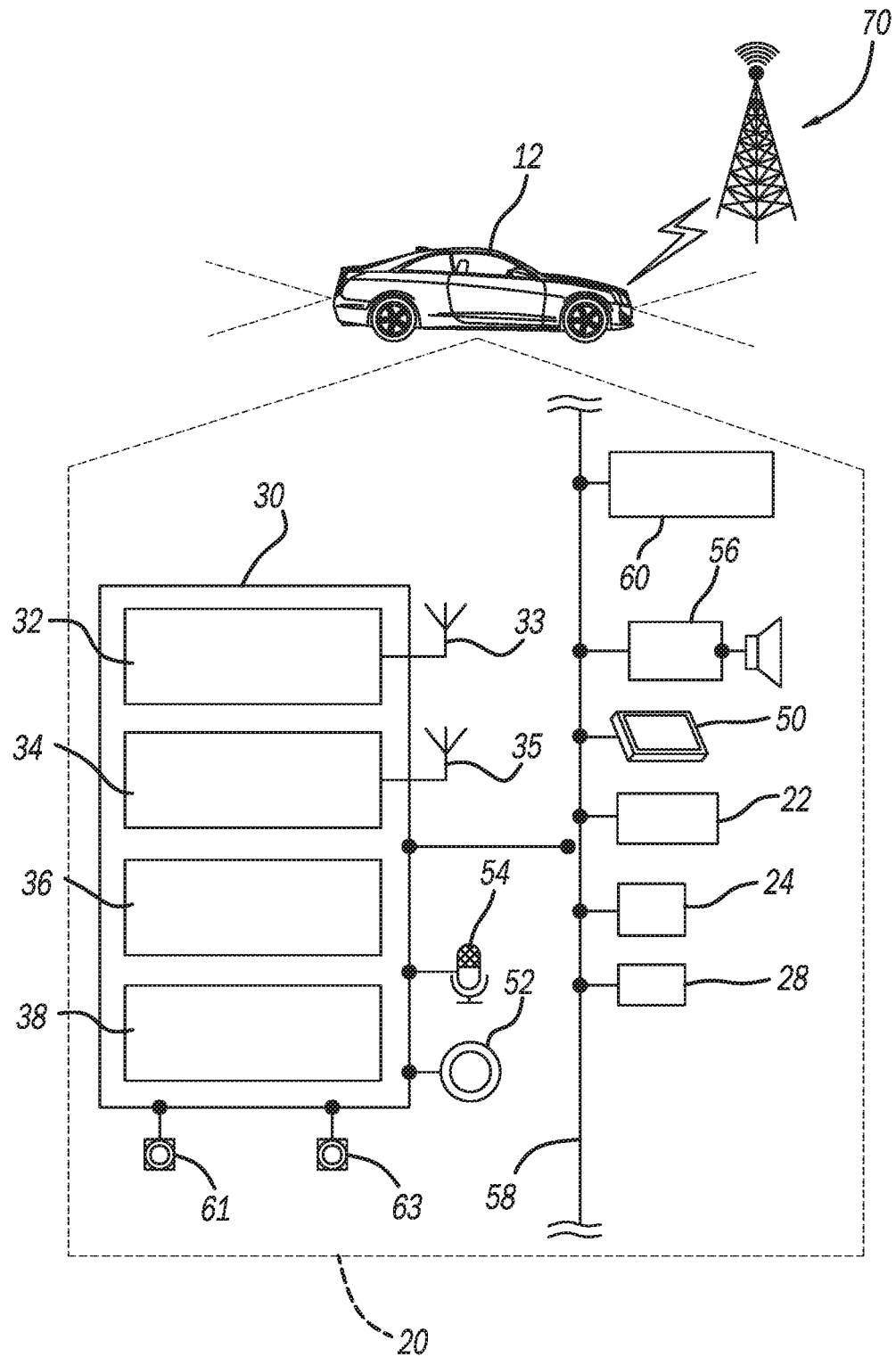
FIG. 1 is a block diagram depicting an exemplary embodiment of an electronics system capable of utilizing the system and method disclosed herein.

With reference to FIG. 1, vehicle 12 is depicted in the illustrated embodiment as a sports utility vehicle (SUV), but it should be appreciated that any other vehicle including motorcycles, trucks, passenger sedan, recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12. The power train system may also be a start-stop system that will cause the engine to automatically transition to an inactive state (from an active state) when the vehicle is stopped so as to reduce the amount of idling time and thus to reduce fuel consumption and emissions.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-58, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a remote computer or facility via a land network (not shown) and telematics unit 30. Other examples of known VSMs 28 are a throttle controller, brake controller, and a steering controller. As follows, the throttle controller electronically or mechanically controls the vehicle's throttle, brake controller electronically or mechanically controls the vehicle's brakes, and the steering controller electronically or mechanically controls the vehicle's steering. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from a constellation of GNSS (or BDS) satellites. The GNSS received can determine a current vehicle location based on reception of a plurality of GNSS signals from the constellation of GNSS satellites. The vehicle location information can then be communicated to the telematics unit 30, or other VSMs, such as the onboard computer 60. In one embodiment (as shown in FIG. 1), the telematics unit 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM 24 to direct one or more vehicle functions or operations including, for example, controlling central locking, controlling an electronic parking brake, power sun/moon roof, the vehicle's head lamps, air conditioning operations, power mirrors, controlling the vehicle primary mover (e.g., engine, primary propulsion system), and/or controlling various other vehicle system modules (VSMs).

Telematics unit 30 is capable of communicating data via SRWC through use of SRWC circuit 32 and/or via cellular network communications through use of a cellular chipset 34, as FIG. 1 depicted in the illustrated embodiment. The telematics unit 30 can provide an interface between various VSMs of the vehicle 12 and one or more devices external to the vehicle 12, such as one or more networks or systems at a remote call center (e.g., ON-STAR by GM). This enables the vehicle to communicate data or information with remote systems at a remote call center (not shown).

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

Telematics unit 30 can also, for example, provide vehicle 12 with certain known advanced driver-assistance system (ADAS) features, which can provide Level Two and Level Three autonomous system functionality such that vehicle 12 can handle minor dynamic driving tasks but still require intervention from a human and may, in certain situations, require assistance from a human. Examples of known ADAS features include adaptive cruise control (e.g., Full Speed Range Adaptive Cruise Control or "FSRACC") and lane assist systems, which control certain aspects of the driving experience despite a human having their hands physically on the steering wheel. As is known, adaptive cruise control functionality is one that will cause vehicle 12 to move at a constant rate of speed while still attempting to maintain at least a predetermined distance between the vehicle and objects in a path of the vehicle. For instance, while traveling along a path, vehicle 12 will automatically adjust its speed to maintain a safe distance from third-party vehicles (target vehicles) traveling ahead of it. Moreover, if a third-party vehicle ahead of vehicle 12 slows to a halt, then vehicle 12 will also slow to a halt and stop at a certain distance away from the third-party vehicle (e.g., four (4) meters).

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as at a remote call center. And, in other embodiments, other protocols can be used for V2V or V2I communications.

The SRWC circuitry 32 enables the telematics unit 30 to transmit and receive SRWC signals, such as BLE signals. The SRWC circuit can allow the telematics unit 30 to connect to another SRWC device (e.g., a smart phone, target vehicle 99, etc.). Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at a remote call center or server) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, audio system 56, one or more external cameras 61, and a lidar 63. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, standalone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display 50 is preferably a touch-screen graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. For example, display 50 can be the touch screen of the vehicle's infotainment module at the center console of the vehicle's interior. Various other vehicle-user interfaces can also be utilized, as the interfaces of FIG. 1 are only an example of one particular implementation. The external camera (s) 61 can be part of a forward camera module (FCM) installed on the front bumper fascia of the vehicle 12 or at the externally facing side of the vehicle's rearview mirror or one of the sideview mirrors. The external camera(s) 61 can also be positioned to view the locations out front of the vehicle 12. In addition, the one or more external cameras 61 can be operative to capture an image of a field of view (FOV) which may include static and dynamic objects proximate to the vehicle. The lidar 63 can be installed on the front bumper fascia or roof of vehicle 12. Lidar 63 may be employed to detect objects and provide a range to and orientation of those objects using reflections from the objects providing multiple scan points that combine as a point cluster range map. For example, lidar 63 can generate a laser beam, transmit the laser beam into the FOV and capture energy reflected from a target. Lidar 63 may also employ time-of-flight to determine the distance of objects from which the pulsed laser beams are reflected Advanced Driver Assistance System To carry out the ADAS hands-free driving assistance feature, discussed above, telematics unit 30 can use sensor and module outputs (e.g., the one or more external cameras 61, lidar 63, SRWC circuitry 32, GNSS receiver 22, etc.) capable of identifying vehicle location, locating roadway markers, proximate vehicles, and other external objects. Known sensor fusion algorithms (e.g., stored in memory 38) provides accurate tracking of external objects as well as calculation of appropriate attributes such as relative velocities, accelerations, and the like. Known image processing techniques may be used to identify, locate, and monitor objects within the FOV from the external camera(s) 61 (e.g., target vehicle 99). The identification, location, and monitoring of these objects and the surrounding environment may facilitate the creation of a three dimensional (3D) object map (which may include depth map characteristics) in order to control the vehicle in the changing environment. This object map may also at least temporarily be stored to memory 38.

When one or more of the objects within the object map is determined to be a vehicle, telematics unit 30 can then be operative to receive a data from this vehicle via SRWC circuitry 32 indicative of the vehicle's location and movement characteristics (i.e., V2V data). Moreover, telematics unit 30 may generate control signals for coupling to other vehicle system modules, such as the throttle controller, brake controller and steering controller VSMs 28 in order to control certain operational aspects of the vehicle 12 in response to the image processing techniques and/or sensor fusion algorithms and/or V2V data in response to a sensor or module output. Telematics unit 30 may be operative to adjust the speed of the vehicle by reducing or increasing the throttle via the throttle controller 28 or to apply or release the friction brakes via the brake controller 28 in response to the image processing techniques and/or sensor fusion algorithms and/or V2V data in response to a sensor or module output. Telematics unit 30 may also be operative to adjust the direction of the vehicle controlling the vehicle steering via the steering controller 28 in response to the image processing techniques and/or sensor fusion algorithms and/or V2V data in response to a sensor or module output. For example, while traveling along a roadway, telematics unit 30 can target an open lane on the roadway and then cause the vehicle 12 to merge into that target lane so as to move around and pass a slow moving target vehicle (e.g., the automated lane-change functionality of the SUPER CRUISE™ feature by GENERAL MOTORS™).

Method

The method or parts thereof can be implemented in a computer program product (e.g., telematics unit 30, onboard computer 60, one or more VSMs 28 etc.) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another. For the purposes of convenience, the discussion hereinafter is explained with reference to vehicle 12 carrying out each of the method steps. However, it should be understood that telematics unit 30, onboard computer 60, one or more VSMs 28, or some other (onboard or remote) computer program product, is controlling the behavior of the vehicle 12.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method. For the purposes of convenience, the discussion hereinafter is explained with reference to vehicle 12 carrying out each of the method steps. However, it should be understood that telematics unit 30, onboard computer 60, one or more VSMs 28, or some other (onboard or remote) computer program product, is controlling the behavior of the vehicle 12.

Figure 2:
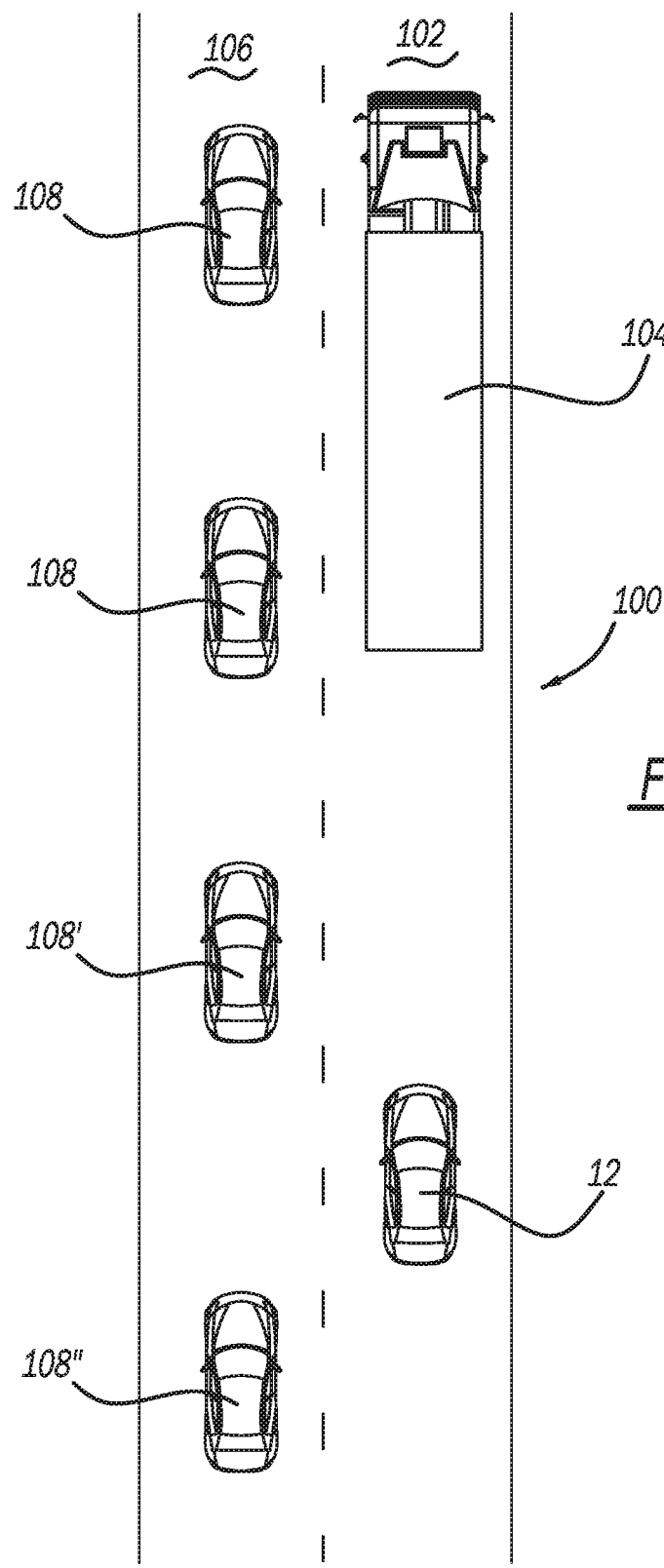
FIG. 2 is an illustrative aspect of the environment for which to implement exemplary system and method aspects disclosed herein.

With reference to FIG. 2, vehicle 12 is traveling along a route (which is a roadway designated herein as reference number 100) at a driver-selected speed (e.g., 65 miles per hour), while ADAS hands-free driving assistance feature is activated and assisting in vehicle operations. While traveling at this selected speed, vehicle 12 approaches a slower moving third-party vehicle traveling within its own lane 102 (e.g., at 55 miles per hour). Through the image processing techniques and/or sensor fusion algorithms and/or V2V data, in response to a sensor or module output (e.g., the one or more external cameras 61, lidar 63, SRWC circuitry 32, GNSS receiver 22, etc.), this third-party vehicle is recognized by vehicle 12 as a Common In-Path Vehicle (CIPV) 104. Subsequently, vehicle 12 senses whether or not it is safe for it to merge into a target lane 106 for the proposes of passing the slower-moving CIPV 104. However, vehicle 12 also recognizes that one or more target vehicles 108 are already traveling in the target lane 106 and are positioned at locations which prevent vehicle 12 from safely merging into the target lane 106. For example, these target vehicles 108 are driving in parallel to host vehicle 12 and spaced at distances that are not large enough for vehicle 12 to safely merge in between two of the target vehicles 108. When this occurs, vehicle 12 finds itself in a boxed in and will thus have to wait until at least two of the target vehicles 108 move farther apart and create a sufficient gap. Thus, box-in driving situations of this nature limit the host vehicle's 12 freedom to merge from one lane to another. Due to the slower moving CIPV 104, these box-in driving situations also limit the host vehicle's 12 freedom to travel at a speed desired by the vehicle's driver (e.g., 65 mph). As skilled artisans will understand, the driver-selected speed is the speed the driver sets when the ADAS hands-free driving assistance feature has been enabled.

When the host vehicle 12 is a torque limited system, it will not exchange driver satisfaction for the ability to substantially increase its speed in an effort to find sufficient target vehicle gaps at other areas along roadway 100. Thus, the torque limited host vehicle 12 can be stuck waiting a substantial amount of time before a suitable gap opens up near its position behind CIPV 104. As such, waiting for suitable gaps to open up can, in itself, create vehicle driver and/or passenger dissatisfaction. To overcome this problem, as discussed below, the host vehicle 12 will predict when a box-in driving situation is likely to occur and then move into a target lane in advance of this box-in driving situation taking place. Moreover, the host vehicle 12 can predict when a box-in driving situation is likely to occur because host vehicle 12 is stuck behind a slow-moving CIPV 104 and one or more target vehicles 108 are backing up in the target lane 106 or when host vehicle 12 is stuck behind a slow-moving CIPV 104 and one or more target vehicles 108, in the target lane 106, are approaching from the rear of host vehicle 12.

Figure 3:
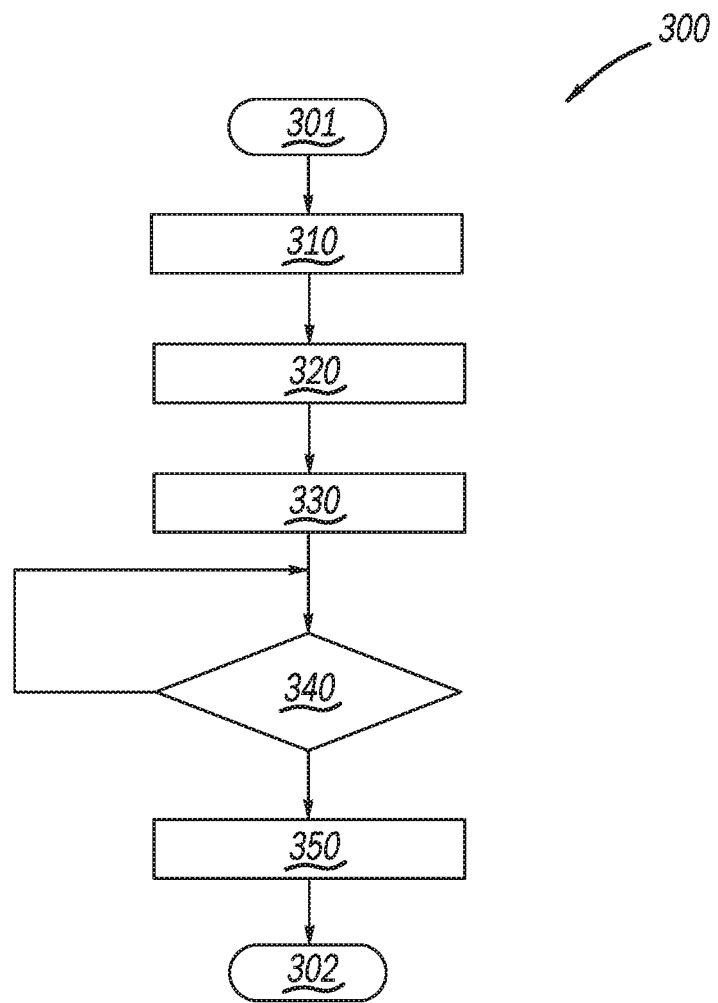
FIG. 3 is an exemplary flow chart for the utilization of exemplary system and method aspects disclosed herein.

With reference to FIG. 3, one exemplary embodiment in which host vehicle 12 avoids a box-in driving situation can be carried out by method 300. Method 300 begins at 301 in which the vehicle 12 (host vehicle) is moving along a route 100 while the ADAS hands-free driving assistance feature is activated and assisting in vehicle operations. Moreover, host vehicle 12 comes into contact with a CIPV 104 that is moving slower than the host vehicle 12 is traveling. As this point, the host vehicle 12 will establish a lane-change trigger threshold 109 at a location relevant to the movement of CIPV 104 and along the route 100. As follows, the lane-change trigger threshold is a location at which host vehicle 12 will begin the process of merging from its original lane 102 to a target lane 106 for the purposes of passing the slower moving CIPV 104. For example, the trigger threshold can be based on a headway time such that the location of the threshold trigger is dependent on the speed and slight changes of direction of the host vehicle 12 (i.e., dependent on vehicle velocity). As follows, if the trigger threshold is calibrated to be 1 seconds behind the CIPV 104 while host vehicle is moving approximately 85 mph towards the CIPV 104, then the host vehicle 12 will begin to merge into the target lane when it arrives at a distance of approximately 40 meters behind the CIPV 104 (i.e., it would take approximately one second for the host vehicle 12 to reach 40 meters). However, if the host vehicle slows down to approximately 47.5 mph, then the host vehicle 12 would begin to merge into the target lane when it arrives at a distance of approximately 20 meters behind the CIPV 104.

In step 310, host vehicle 12 will determine whether a preventable box-in driving situation is detected (e.g., via a review of the three dimensional (3D) object map). For example, with additional reference to FIG. 4, in this embodiment, the preventable box-in driving situation includes two or more target vehicles 108 slowing down in the target lane 106 such that they will likely become adjacent to host vehicle 12 and spaced close enough together that the target vehicles 108 would prevent the host vehicle 12 from safely merging into the target lane 106 (e.g., the locations of target vehicle 108' and target vehicle 108" relative to each other as well as host vehicle 12 in FIG. 2). In particular, since the target vehicles 108 would be moving slower (e.g., 55 mph), the host vehicle 12 will determine whether it is approaching a relative location that is lateral to the rear end 110 of the closest target vehicle 108 (i.e., the target vehicle 106 that is following behind the rest of the target vehicles 106 in the group).

Figure 4:
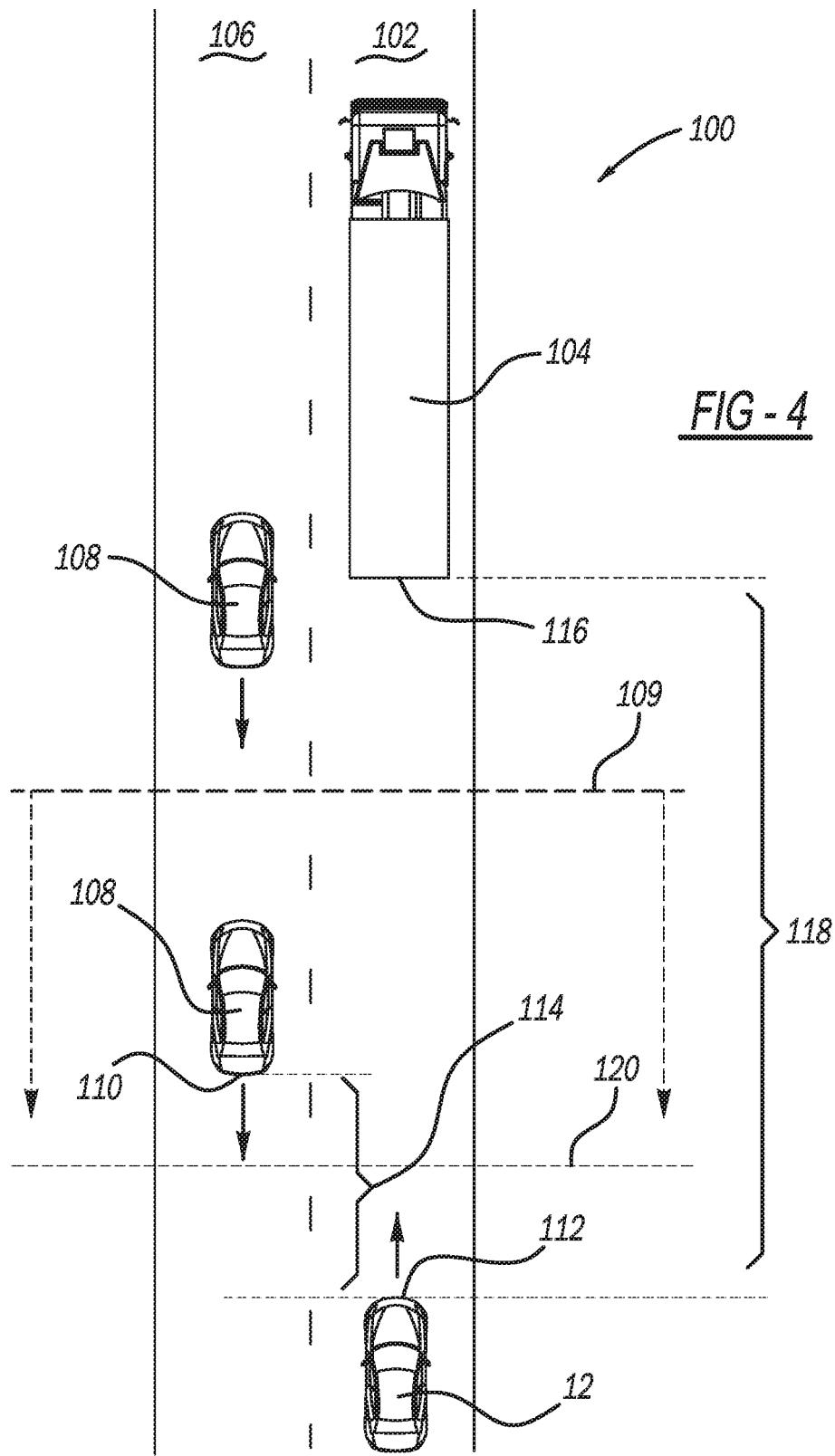
FIG. 4 is an illustrative aspect of the process flow of FIG. 3.

In step 320, host vehicle 12 will calculate the longitudinal distance between a location lateral to its front end 112 and the location lateral to the rear end 110 of the closest target vehicle 108, which can be considered a relevant distance (shown as reference number 114 in FIG. 4). Host vehicle 12 will also calculate the speed of the CIPV 104 (e.g., via the three dimensional (3D) object map) as well as the driver-selected speed of host vehicle). Host vehicle 12 will then calculate the difference between its driver-selected speed and the speed of the CIPV 104 as a speed differential. Moreover, host vehicle 12 may also at least temporarily store the speed differential and the relevant distance to memory 38.

In step 330, host vehicle 12 will access one or more functions or lookup tables, which relate vehicle driving situations to trigger threshold distance, from memory 38. Host vehicle 12 will then provide the calculated speed differential and relevant distance to the one or more functions or lookup tables, which relate vehicle driving situations to trigger threshold distance. The one or more functions or lookup tables will then provide host vehicle 12 with an adjusted location for the lane-change trigger threshold 120. Moreover, host vehicle 12 will adjust the location of the lane-change trigger threshold 120 accordingly. For example, the lane-change trigger threshold can be adjusted from 0.5 seconds headway time to 4.5 seconds headway time. In addition, these one or more functions can be derived from known traffic flow relationships provided by the National Highway Traffic Safety Administration (NHTSA) and the one or more lookup tables can be populated with values based on these known NHTSA relationships. In particular, the NHTSA traffic-flow scenario relationships can be represented by the following function:

$$f(x) = 0.15 e^{-0.15(x-0.5)} \{\forall x \geq 0.5; 0 \text{ otherwise}\} \quad (1)$$

where X is considered the headway time.

In step 340, host vehicle 12 will determine whether or not it has reached the location of the adjusted lane change threshold 120. As follows, host vehicle 12 will determine whether the distance between the host vehicle 12 and CIPV 104 is less than the distance between the CIPV 104 and adjusted lane change threshold location 120. When host vehicle 12 has reached the adjusted lane change threshold location 120, then method 300 will move to step 350; otherwise, method 300 will return to step 340 where host vehicle 12 will continue to monitor its location relative to the adjusted lane change threshold and determine whether vehicle 12 has reached the adjusted lane change threshold location 120. In step 350, host vehicle 12 will implement an automated overtake action. For example, host vehicle 12 will autonomously move from its original lane 102 to the target lane 106. Host vehicle 12 may also provide indicator signals to the target vehicles 108, which notify the target vehicles 108 that host vehicle 12 is moving into the target lane 106 (e.g., via one or more blinking turn signals via one or more vehicle headlamps and/or tail lamps). After step 350, method 300 moves to completion 302.

Figure 5:
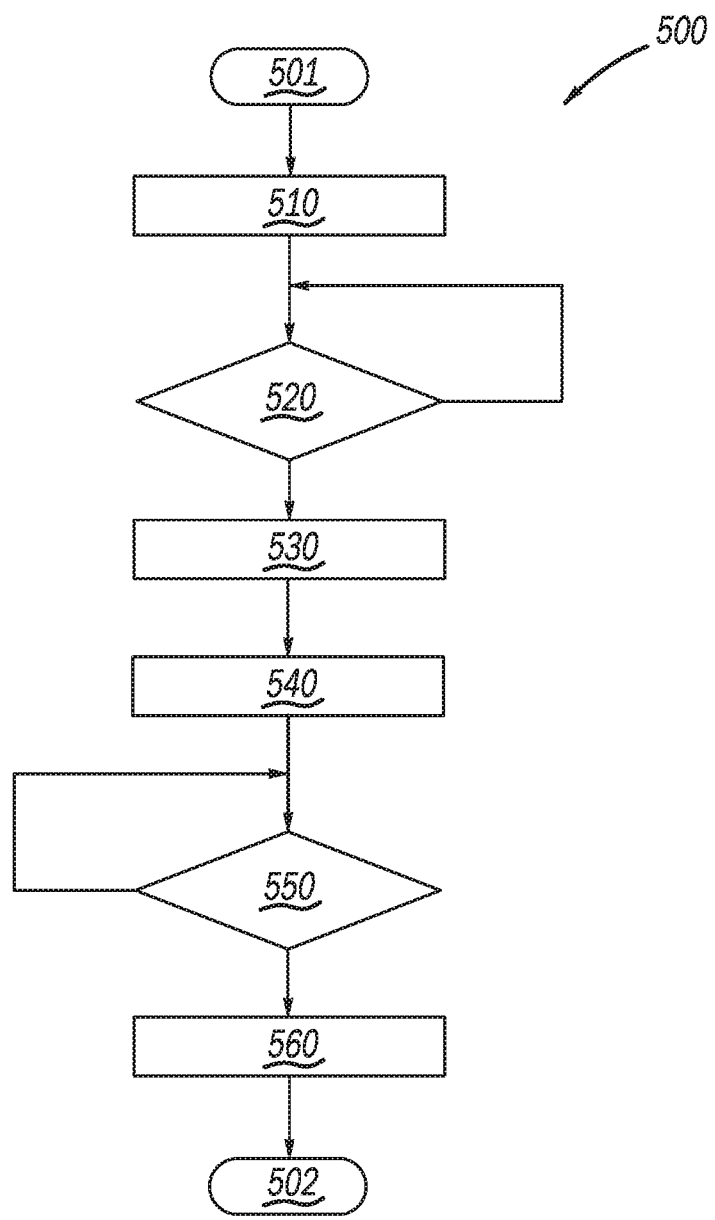
FIG. 5 is another exemplary flow chart for the utilization of exemplary system and method aspects disclosed herein.

With reference to FIG. 5, another exemplary embodiment in which host vehicle 12 avoids a box-in driving situation can be carried out by method 500. Method 500 begins at 501 in which the vehicle 12 (host vehicle) is moving along a route 100 while the ADAS hands-free driving assistance feature is activated and assisting in vehicle operations. Moreover, host vehicle 12 comes into contact with a CIPV 104 that is moving slower than the host vehicle 12 is traveling. As this point, the host vehicle 12 will establish a lane-change trigger threshold 109 based on headway time and thus at a location relevant to the movement of CIPV 104 and along the route 100 (discussed above).

In step 510, host vehicle 12 detects a preventable box-in driving situation (e.g., via a review of the three dimensional (3D) object map). For example, with additional reference to FIG. 6, in this embodiment, the preventable box-in driving situation includes a target vehicle 108, travelling in the target lane 106, at a rate of speed that is substantially faster than the host vehicle 12 (e.g., 75 mph). As such, the front end 122 of target vehicle 108 is approaching a location that is lateral to the rear end 124 of host vehicle 12. In step 520, host vehicle 12 determines whether it is within a zone of opportunity 126 (i.e., whether host vehicle 12 is closer to the CIPV 104 than an opportunity threshold 127 location). In particular, the zone of opportunity 126 is an area behind the CIPV 104, which has a size based on the location of the target vehicle 108, that is long enough for host vehicle 12 to safely merge into target lane 106 prior to the arrival of the target vehicle 108. As follows, once host vehicle 12 moves out of the zone of opportunity 126, it will no longer be safe for the vehicle to merge into the target lane 106 due to the likelihood of impact between target vehicle 108 and host vehicle 12. Moreover, the closer the target vehicle 108 gets to host vehicle 12 the shorter the zone of opportunity 126 becomes. Thus, the size of the zone of opportunity 126, host vehicle 12 is dependent on the distance between the front end 122 of target vehicle 108 and a location that is lateral to the rear end 124 of host vehicle 12, which can be considered an opportunity distance (shown as reference number 119 in FIG. 6). This zone of opportunity 126 may also be based on headway time, for example, when the target vehicle 108 is found to be 30-40 meters behind host vehicle 12, the zone of opportunity may be within one (1) second of headway time behind the CIPV 104. The host vehicle 12 may determine the size of the zone of opportunity 126 by providing the opportunity distance to one or more functions or lookup tables, stored in memory 38, which relate the space between one or more target vehicles 108 and host vehicle 12 to zone of opportunity size. If host vehicle 12 is within the zone of opportunity 126, then method 500 moves to step 530; otherwise, method 500 returns to step 520 where host vehicle 12 will continue to monitor its location relative to the zone of opportunity 126.

Figure 6:
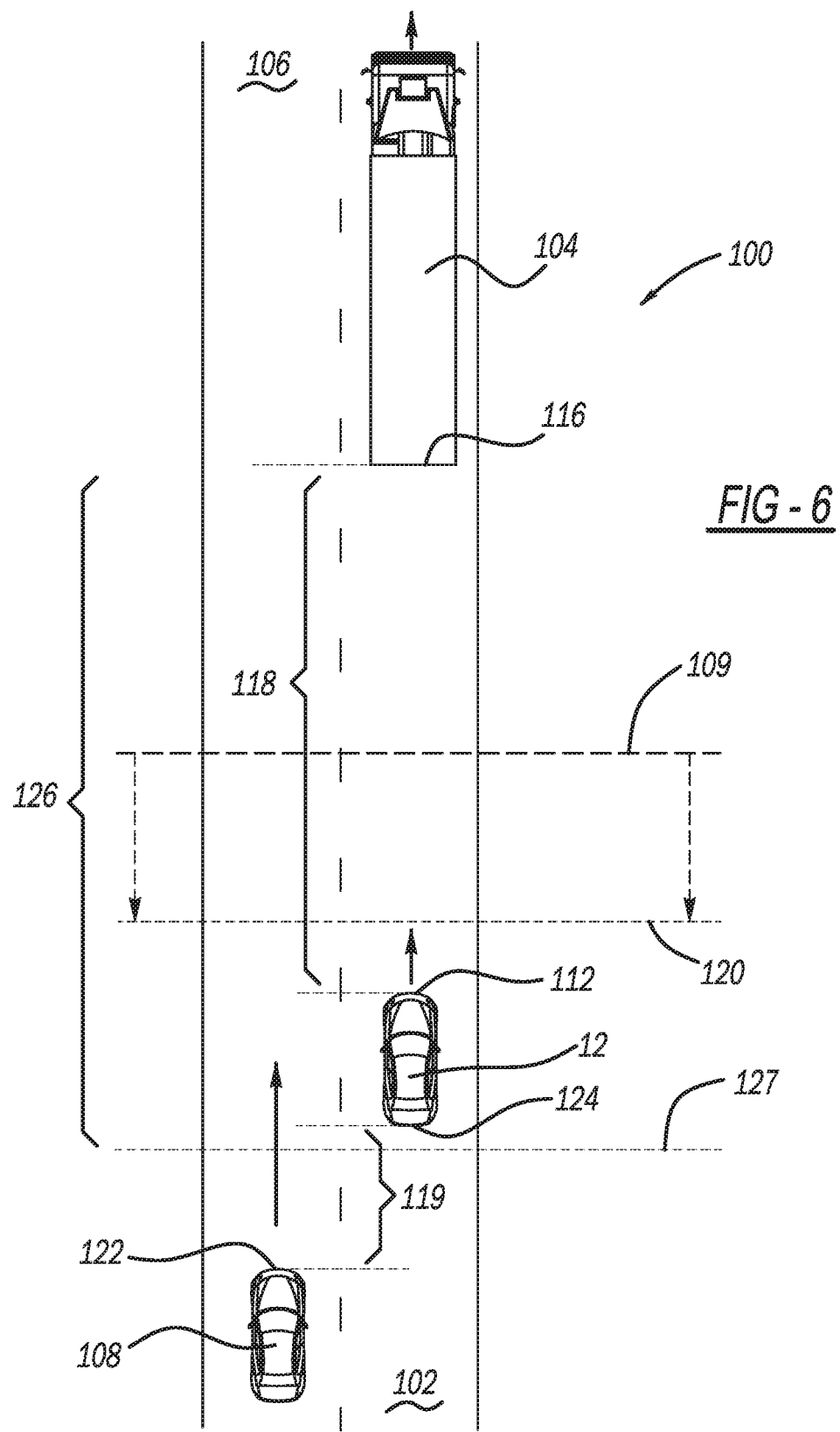
FIG. 6 is an illustrative aspect of the process flow of FIG. 5.

In step 530, host vehicle 12 will calculate the longitudinal distance between its front end 112 and the rear end 116 of the CIPV 104, which can be considered a relevant distance (shown as reference number 118 in FIG. 6). Host vehicle 12 will also calculate the speed of the CIPV 104 as well as well as the driver-selected speed of host vehicle. Host vehicle 12 will then calculate the difference between the driver-selected speed and the speed of the CIPV 104 as a speed differential. Moreover, host vehicle 12 may also at least temporarily store the speed differential and the relevant distance to memory 38.

In step 540, host vehicle 12 will access one or more functions or lookup tables, which relate vehicle driving situations to trigger threshold distance, from memory 38 (discussed above). Host vehicle 12 will then provide the calculated speed differential and relevant distance 118 to the one or more functions or lookup tables (e.g., which may be derived from, or include values derived from, NHTSA traffic-flow scenario functions). The one or more functions or lookup tables will then provide host vehicle 12 with an adjusted location for the lane-change trigger threshold 120. Moreover, host vehicle 12 will adjust the location of the lane-change trigger threshold 120 accordingly. For example, the lane-change trigger threshold can be adjusted from one second headway time to 6 seconds headway time (so that the host vehicle 12 will merge into target lane 106 well before the target vehicle 108 can create a box-in situation).

In step 550, host vehicle 12 will determine whether or not it has reached the location of the adjusted lane change threshold 120. As follows, host vehicle 12 will determine whether the actual distance between the host vehicle 12 and CIPV 104 is less than the distance between the CIPV 104 and adjusted lane change threshold location 120. When host vehicle 12 has reached the adjusted lane change threshold location 120, then method 500 will move to step 560; otherwise, method 500 will return to step 550 where host vehicle 12 will continue to monitor its location relative to the adjusted lane change threshold and determine whether vehicle 12 has reached the adjusted lane change threshold location 120. In step 560, host vehicle 12 will implement an automated overtake action. For example, host vehicle 12 will autonomously move from its original lane 102 to the target lane 106. Host vehicle 12 may also provide indicator signals to the target vehicles 108, which notify the target vehicles 108 that host vehicle 12 is moving into the target lane 106 (e.g., via one or more blinking turn signals via one or more vehicle headlamps and/or tail lamps). After step 560, method 500 moves to completion 502.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to prevent a boxed-in driving situation, the system comprising:
   a memory configured to comprise one or more executable instructions and a processor configured to execute the executable instructions, wherein the executable instructions enable the processor to:
   detect a preventable box-in driving situation;
   based on the detection of the preventable box-in driving situation, adjust a location of a trigger threshold along a vehicle path; and
   when a host vehicle reaches the adjusted location of the trigger threshold, command an automated overtake action,
   the preventable box-in driving situation comprises a plurality of target vehicles in a target lane, wherein a host vehicle is approaching a location relative to a rear end of a closest target vehicle of the plurality of target vehicles;
   wherein adjustment of the location of the trigger threshold along the vehicle path is defined as:
   calculate a distance between the rear end of the closest target vehicle of the plurality of target vehicles and a front end of the host vehicle as a relevant distance;
   calculate a driver-selected speed;
   calculate a closest in-path vehicle (CIPV) speed;
   determine an adjusted trigger threshold value based on the relevant distance, driver-selected speed, and closest in-path vehicle (CIPV) speed; and
   based on the adjusted trigger threshold value, adjust the location of the trigger threshold along the vehicle path.

2. The system of claim 1, wherein the automated overtake action causes the host vehicle to move autonomously from a first lane along the vehicle path to a target lane along the vehicle path.

3. The system of claim 1, wherein the preventable box-in driving situation comprises a target vehicle in a target lane along the vehicle path, wherein the target vehicle prevents a host vehicle from moving safely from a first lane along the vehicle path to the target lane.

4. The system of claim 1, wherein the location of the trigger threshold is based on headway time.

5. The system of claim 1, wherein the preventable box-in driving situation is detected via one or more sensors installed on a host vehicle.

6. A method to prevent a boxed-in driving situation, the method comprising:
   detecting, via a processor, a preventable box-in driving situation; and
   based on the detection of the preventable box-in driving situation, via the processor, adjusting a location of a trigger threshold along a vehicle path;
   when a host vehicle reaches the adjusted location of the trigger threshold, via the processor, commanding an automated overtake action,
   the preventable box-in driving situation comprises a plurality of target vehicles in a target lane, wherein a host vehicle is approaching a location relative to a rear end of a closest target vehicle of the plurality of target vehicles;
   wherein adjusting the location of the trigger threshold along the vehicle path is defined as:
   calculating a distance between the rear end of the closest target vehicle of the plurality of target vehicles and a front end of the host vehicle as a relevant distance;
   calculating a driver-selected speed;
   calculating a closest in-path vehicle (CIPV) speed;
   determining an adjusted trigger threshold value based on the relevant distance, driver-selected speed, and closest in-path vehicle (CIPV) speed; and
   based on the adjusted trigger threshold value, adjusting the location of the trigger threshold along the vehicle path.

7. The method of claim 6, wherein the automated overtake action causes the host vehicle to move autonomously from a first lane along the vehicle path to a target lane along the vehicle path.

8. The method of claim 6, wherein the preventable box-in driving situation comprises a target vehicle in a target lane along the vehicle path, wherein the target vehicle prevents a host vehicle from moving safely from a first lane along the vehicle path to the target lane.

9. The method of claim 6, wherein the location of the trigger threshold is based on headway time.

10. The method of claim 6, wherein the preventable box-in driving situation is detected via one or more sensors installed on a host vehicle.

11. A system to prevent a boxed-in driving situation, the system comprising:
    a memory configured to comprise one or more executable instructions and a processor configured to execute the executable instructions, wherein the executable instructions enable the processor to:
    detect that a host vehicle is located within a zone of opportunity;
    detect a preventable box-in driving situation;
    based on the detection of the preventable box-in driving situation, adjust a location of a trigger threshold along a vehicle path; and
    when a host vehicle reaches the adjusted location of the trigger threshold, command an automated overtake action,
    the preventable box-in driving situation comprises a target vehicles in a target lane, wherein the target vehicle is approaching a location relative to a rear end of the host vehicle, and wherein the target vehicle is outside of the zone of opportunity;

wherein adjustment of the trigger threshold is defined as:
  calculate a distance between the rear end of a closest in-path vehicle (CIPV) and a front end of the host vehicle as a relevant distance;
  calculate a driver-selected speed;
  calculate a closest in-path vehicle (CIPV) speed;
  determine an adjusted trigger threshold value based on the relevant distance, driver-selected speed, and closest in-path vehicle (CIPV) speed; and
based on the adjusted trigger threshold value, adjust the location of the trigger threshold along the vehicle path.

12. The system of claim 11, wherein the automated overtake action causes the host vehicle to move autonomously from a first lane along the vehicle path to a target lane along the vehicle path.

13. The system of claim 11, wherein the location of the trigger threshold is based on headway time.

14. The system of claim 11, wherein the preventable box-in driving situation is detected via one or more sensors installed on a host vehicle.

* * * * *